United States Patent [19]

Furcsik et al.

[11] Patent Number: 5,035,912
[45] Date of Patent: Jul. 30, 1991

[54] STARCH JELLY CANDY

[75] Inventors: Susan L. Furcsik, Lake Station, Ind.; David J. Mauro, Dolton, Ill.

[73] Assignee: American Maize-Products Company, Stamford, Conn.

[21] Appl. No.: 540,360

[22] Filed: Jun. 19, 1990

[51] Int. Cl.$^5$ .................. A23G 3/00; A23L 1/0522
[52] U.S. Cl. .................. 426/578; 426/658; 426/660
[58] Field of Search .................. 426/578, 658, 660

[56] References Cited

U.S. PATENT DOCUMENTS

| | | | |
|---|---|---|---|
| 3,218,177 | 11/1965 | Robinson et al. | 426/578 |
| 3,265,508 | 8/1966 | Wurzburg et al. | 426/578 |
| 3,265,509 | 8/1966 | Wurzburg et al. | 426/578 |
| 3,446,628 | 5/1969 | Schoch et al. | 426/578 |
| 3,687,690 | 8/1972 | Moore | 426/578 |
| 4,073,959 | 2/1978 | Durand | 426/578 |
| 4,120,987 | 10/1978 | Moore | 426/660 |
| 4,225,627 | 9/1980 | Moore | 426/660 |
| 4,428,972 | 1/1984 | Wurzburg et al. | 426/578 |
| 4,567,055 | 1/1986 | Moose | 426/660 |
| 4,704,293 | 11/1987 | Moore et al. | 426/660 |
| 4,726,957 | 2/1988 | Lacourse et al. | 426/660 |
| 4,770,710 | 9/1988 | Friedman et al. | 426/658 |
| 4,774,328 | 9/1988 | Friedman et al. | 426/658 |
| 4,789,557 | 12/1988 | Friedman et al. | 426/578 |
| 4,790,997 | 12/1988 | Friedman et al. | 426/578 |
| 4,792,458 | 12/1988 | Friedman et al. | 426/578 |
| 4,798,735 | 1/1989 | Friedman et al. | 426/578 |
| 4,874,628 | 10/1989 | Eden et al. | 426/578 |
| 4,886,678 | 12/1989 | Chiu et al. | 426/658 |

OTHER PUBLICATIONS

"A Text Book on Candy Making" by Alfred E. Leighton, The Manufacturing Confectioner Publishing Company, Copyright 1952-Lesson 8-Pectin Jellies and Their Manufacture-pp. 78-103.

Primary Examiner—Jeanette Hunter
Attorney, Agent, or Firm—Lucas & Just

[57] ABSTRACT

A starch jelly candy is made from a starch jelly formulation of a starch composition of a first starch from a plant having a dull horny (duh) homozygous genotype and a second starch obtained from a plant having a homozygous genotype selected from the group consisting of amylose extender dull (aedu), amylose extender sugary-2 (aesu2), amylose extender dull shrunken-1 (aedushl), dull sugary-2 (dusu2), and mixtures thereof; a sweetener; and water. the mixture is cooked at the temperature of 240° F. (116° C.) instead of the conventional cooking temperature of 340° F. (170° C.).

18 Claims, No Drawings

STARCH JELLY CANDY

This invention relates to a starch jelly candy made from a formulation having as an essential ingredient therein a starch composition comprising a first starch obtained from a plant having a dull horny (duh) homozygous genotype and a second starch obtained from a plant having a homozygous genotype selected from the group consisting of amylose extender dull (aedu), amylose extender sugary-2 (aesu2), amylose extender dull shrunken-1 (aedushl), dull sugary-2 (dusu2), and mixtures thereof.

Starch jelly candy, also known as jelly gum confections, gum drops, gum slices, fruit gums, or jelly beans, is typically made from a starch jelly candy formulation of a sweetener, a starch composition and water. The starch composition provides texture and body to the starch jelly candy as well as water retention properties. Typically, the starch composition comprises a conventional high amylose starch and a thin-boiled starch. Conventional high amylose starch contains at least 40% amylose and is obtained from a starch-bearing plant having a homozygous genotype of amylose extender amylose extender (aeae). Thin-boiled starch is a starch which has been chemically treated with an acid in order to decrease the viscosity of a slurry made with the starch. See, for example, U.S. Pat. Nos. 3,218,177 issued Nov. 16, 1965; 3,265,509 issued Aug. 9, 1966; and 4,726,957 issued Feb. 23, 1988.

Typically, starch jelly candies are made by cooking the starch jelly candy formulation at a temperature of about 340° F. (170° C.); depositing the cooked, homogeneous mixture into molds; and cooling the homogeneous mixture in the molds to form a solid, homogeneous starch jelly candy.

One problem associated with conventional starch jelly candies is the large amount of energy needed to fully gelatinize and cook the high amylose starch. There is a need in the candy industry to decrease the amount of energy needed to manufacture starch jelly candy.

Additionally, there is a trend in the food industry to eliminate chemically modified or treated starches such as thin-boiled starches. There is a large consumer market for "natural" food and thus a desire by the food manufacturer to use as many non-altered components in their food formulations as possible in order to satisfy the market demand for "natural" food.

It has now been discovered that a starch jelly candy can be made without a chemically modified starch and with a reduction in the amount of energy needed to make the starch jelly candy. Such is made possible by employing a starch jelly candy formulation which contains a starch composition comprising a first starch obtained from a plant of the dull horny (duh) homozygous genotype, and a second starch obtained from a plant having a homozygous genotype selected from the group consisting of amylose extender dull (aedu), amylose extender sugary-2 (aesu2), amylose extender dull shrunken-1 (aedushl), dull sugary-2 (dusu2) and mixtures thereof.

A starch jelly candy formulation according to the present invention comprises the starch composition of the present invention, a sweetener, and water. Flavorings and coloring components can also be added. In order to make a starch jelly candy in accordance with the present invention, a starch jelly formulation is cooked, deposited into molds and cooled to form a solid starch jelly candy.

It has been found that, by employing the starch jelly formulation containing the starch composition of the present invention, a cooking temperature of about 240° F. (116° C.) or lower may be employed. The decrease of cooking temperature from 340° F. (170° C.) to 240° F. (116° C.), i.e. the decrease of 100° F. (38° C.) in the cooking temperature, translates into savings of energy and time during processing of the starch jelly candy formulation. In addition, there is decreased time needed to cool the formulation once it has been molded.

The starch composition of the present invention employs two or more non-converted, natural starches while still obtaining the organoleptic characteristics such as taste, mouth feel, body and texture, of a starch jelly candy made from a conventional starch composition of high amylose and thin-boiled starch. The starch composition of the present invention satisfies the need for a more "natural" food. Additionally, the starch composition of the present invention also provides similar water retention characteristics of the conventional starch composition.

In addition to satisfying the market's desire for a more natural product, there are cost benefits to using a non-chemically modified starch product.

Preferably, the starch composition of the present invention comprises about 10% to about 90% by weight of the first starch and about 90% to about 10% by weight of the second starch. More preferably, the starch composition of the present invention comprises about 30% to about 70% by weight of the first starch and about 70% to about 30% by weight of the second starch. Good results in accordance with the present invention have been obtained using a starch composition comprising about 50% by weight of the first starch and about 50% by weight of the second starch. The amounts are based on either dry or wet basis, so long as the same basis is used for each starch.

Preferably, the amount of the starch composition of the present invention used in the starch jelly formulation is about 1% to about 25% by weight of the starch formulation of the present invention. More preferably it comprises about 5% to about 20% by weight. Good results have been obtained using about 10% to about 15% by weight.

The amount of sweetener used varies depending on the desired sweetness and the other ingredients used in the starch jelly candy. Suitably, the starch jelly formulation of the present invention contains about 25% to about 75% by weight sweetener.

Water is added to the starch jelly formulation as need to dissolve the solid components of the formulation. Water is suitably added in the amount of between about 20% and 75% by weight of formulation.

The term "starch" as used in the specification and claims herein means not only the substantially pure starch granules as extracted from a starch-bearing plant but also grain products of the starch granule such as flour, grit, hominy, and meal, so long as these starches have not been chemically modified or treated to substantially alter the makeup of the anhydroglucose monomeric units or the polymeric structure of the starch.

Any plant source which produces edible starch and which can be crossbred to produce a plant having a duh, an aedu, an aedushl, an aesu2 or a dusu2 homozygous genotype may be used to obtain the starches which are used to make a starch jelly candy in accordance with the present invention. It has been found that the amylose extender (ae) gene is present in maize and barley, and that cereal grains such as maize contain the dull (du), horny (h), sugary-2 (su2), and shrunken (sh1) genotypes. Maize is the preferred plant source for the starches used in the present invention.

The terms "dull horny" or "duh" genotype as used in the specification and claims mean not only the duh homozygous genotype, duduhh, which has been obtained by standard plant breeding techniques, but also the duh genotype which has been moved to another portion of the plant genome by translocation, inversion, or any other method of chromosome engineering to include variations thereof whereby the disclosed properties of the starch used in the present invention are obtained.

The terms "amylose extender dull" or "aedu" genotype as used in the specification and claims mean not only the aedu homozygous genotype, aeaedudu, which has been obtained by standard plant breeding techniques, but also the aedu genotype which has been moved to another portion of the plant genome by translocation, inversion, or any other method of chromosome engineering to include variations thereof whereby the disclosed properties of the starch used in the present invention are obtained.

The terms "amylose extender sugary-2" or "aesu2" genotype as used in the specification and claims mean not only the aesu2 homozygous genotype, aeaesu2su2, which has been obtained by standard plant breeding techniques, but also the aesu2 genotype which has been moved to another portion of the plant genome by translocation, inversion, or any other method of chromosome engineering to include variations thereof whereby the disclosed properties of the starch used in the present invention are obtained.

The terms "amylose extender dull shrunken-1" or "aedush1" genotype as used in the specification and claims mean not only the aedush1 homozygous genotype, aeaedudush1sh1, which has been obtained by standard plant breeding techniques, but also the aedush1 genotype which has been moved to another portion of the plant genome by translocation, inversion, or any other method of chromosome engineering to include variations thereof whereby the disclosed properties of the starch used in the present invention are obtained.

The terms "dull sugary-2" or "dusu2" genotype as used in the specification and claims mean not only the dusu2 homozygous genotype, dudusu2su2, which has been obtained by standard plant breeding techniques, but also the dusu2 genotype which has been moved to another portion of the plant genome by translocation, inversion, or any other method of chromosome engineering to include variations thereof whereby the disclosed properties of the starch used in the present invention are obtained.

The terms "duh starch", "aedu starch", "aesu2 starch", "aedush1 starch" and "dusu2 starch" as used in the specification and claims mean starches obtained respectively from starch-bearing plants which are of the duh, aedu, aesu2, aedush1, and dusu2 genotypes.

U.S. Pat. Nos. 4,774,328 issued Sept. 27, 1988; 4,790,997 issued Dec. 13, 1988; 4,798,735 issued Jan. 17, 1989; 4,770,710 issued Sept. 13, 1988; and 4,792,458 issued Dec. 20, 1988 disclose, respectively, the duh, aedu, aesu2, aedush1, and dusu2 starches and their use in foodstuffs. These patents are incorporated herein by reference.

The sweetener used in the starch jelly formulation of the present invention suitably comprises corn syrup having a DE between about 30 to about 90 and a sugar component. The sugar component can be conventional sugars such as monosaccharides, disaccharides, or trisaccharides. Suitable monosaccharides include glucose, fructose, ribose, arabinose, mannose, xylose, galactose, or mixtures thereof. Suitable disaccharides include sucrose, maltose, cellobiose, lactose, trehalose, or mixtures thereof. Suitable trisaccharides include maltotriose, raffinose, cellotriose, manninotriose, or mixtures thereof. The sugar component of the sweetener can also be a high intensity sweetener such as saccharine aspartame or Acesulfame-K. The sugar component can be mixtures of various conventional sugars and/or high-intensity sweeteners. It is preferred to use sucrose as the sugar component of the sweetener.

The sweetener suitably comprises about 20% to about 90% by weight corn syrup and about 80% to about 10% by weight of the sugar component. It is preferred to use about 30% to about 80% by weight corn syrup and about 70% to about 20% by weight of the sugar component. It is most preferred to use about 40% to about 70% by weight corn syrup and about 60% to about 30% of the sugar component.

A flavoring and coloring component such as natural flavorants, artificial flavorants, coloring agents, fats, oils, surfactants, humectants, vitamins, or preservatives can also be included in the starch jelly candy of the present invention.

The natural flavorant can be a fruit flavorant such as a fruit puree, a fruit puree concentrate or dehydrated fruit solids. The natural flavorant can also be a spice flavorant.

If the flavoring and coloring component is used to make the starch jelly candy, it can be added in the amount of up to about 10% by weight to the starch jelly formulation. Preferably, the starch jelly candy formulation contains about 0% to about 10% by weight of a flavoring and coloring component.

In order to make a starch jelly candy in accordance with the present invention, first the components of the formulation are combined and stirred together in a container and the contents of the container are heated up to about 280° F. (140° C.). During the heating step, the formulation is stirred. After heating, the starch jelly candy formulation is deposited into a mold. Except for the reduced temperature at which the contents are cooked, as compared to conventional cooking temperatures for starch jelly candies, the steps for forming the starch jelly candy are conventional and conventional equipment can be employed.

More specifically, a starch jelly candy is made in accordance with the present invention by making a formulation of water, corn syrup, sugar and as an essential ingredient therein a starch composition comprising a first starch from a plant of the dull horny (duh) homozygous genotype, and a second starch obtained from a plant having a homozygous genotype selected from the group consisting of amylose extender dull (aedu), amylose extender sugary-2 (aesu2), dull shrunken-1 (aedush1), dull sugary-2 (dusu2), and mixtures thereof. Next, the formulation is heated to a temperature of about 240° F. (116° C.) while the formulation is constantly stirred to form a homogeneous mix. Any conventional piece of equipment, for example a jacketed kettle equipped with an impeller or a jet cooker, is used to heat and mix the formulation. Once the formulation has reached 240° F. (116° C.), the formulation is deposited into at least one starch mold where the hot mix is allowed to set. A formulation made in accordance with the present invention sets in a temperature range of 90° F. (30° C.) to 120° F. (50° C.). Setting is accomplished in a conventional manner. After setting, the candies are removed from the mold. Starch molds are conventional.

It will be understood by those of skill in the art that the temperature to which the starch jelly candy formulation of the present invention is heated can be higher than 240° F. (116° C.) without having a deleterious effect on the starch jelly candy.

These and other aspects of the present invention may be more fully understood with reference to the following examples:

EXAMPLE 1

This example illustrates a starch jelly candy made in accordance with the present invention compared to a conventional starch jelly candy made using conventional high amylose starch and thin-boiled starch. These starch jelly candies were made from the starch jelly formulation in Table I below:

TABLE I

| | Starch Jelly Formulation, Amount (% by Weight) | |
|---|---|---|
| Ingredients | PRESENT INVENTION | CONVENTIONAL |
| 44/62 csu* | 44.9 | 44.9 |
| Sugar, Fine Granular (Sucrose) | 32.0 | 32.0 |
| Water | 12.4 | 12.4 |
| duh Starch | 7.4 | 0 |
| aedu Starch | 3.1 | 0 |
| 90 Thin-boiled Starch | 0 | 7.4 |
| Amaizo 5** (50% amylose) | 0 | 3.1 |
| Citric Acid | 0.1 | 0.1 |
| Sodium Citrate | 0.1 | 0.1 |

*44/62 csu is a corn syrup made from common starch having a DE of 62 and a Baume of 44.
**Amaizo 5 is a corn starch manufactured by American Maize Products Company of Hammond, Indiana.

All ingredients used in the starch jelly candy made in accordance with the present invention were mixed together to form a starch jelly formulation in accordance with the present invention and then heated to 240° F. (116° C.) using a steam jacketed kettle equipped with an impeller.

All ingredients used in the conventional starch jelly candy were mixed together to form a conventional starch jelly formulation and then heated to 325° F. (163° C.) using a jet cooker supplied with 150 psi steam.

In both cases, the cooked slurries were deposited into starch molds and allowed to solidify into a starch jelly candy at ambient pressure and temperature.

The organoleptic characteristics such as taste, mouth feel, texture and body, as well as the water retention characteristics, of each of the starch jelly candies made according to both the conventional formulation and the formulation of the present invention were substantially similar.

EXAMPLE 2

This is another example of a starch jelly candy made in accordance with the present invention. The following starch jelly formulation is employed:

TABLE 2

| Starch Jelly Formulation | |
|---|---|
| Ingredients | Amount (% by Weight) |
| 44/62 csu | 45 |
| Sugar, Fine Granular (Sucrose) | 32 |
| Water | 12.4 |
| duh Starch | 7.4 |
| aesu2 Starch | 1.5 |
| dusu2 Starch | 1.5 |
| Citric Acid | 0.1 |
| Sodium Citrate | 0.1 |

In order to make starch jelly candy, all ingredients are mixed to form a starch jelly formulation in accordance with the present invention and then cooked at 240° F. (116° C.). After cooking they are transferred into starch molds and allowed to solidify.

EXAMPLE 3

In this example a starch jelly candy is made in accordance with Example 2, except 3.0% by weight of aesu2 starch is substituted for the aesu2 and dusu2 starch component.

EXAMPLE 4

In this example a starch jelly candy is made in accordance with Example 2, except 3.0% by weight of aedush1 starch is substituted for the aesu2 and dusu2 starch component.

EXAMPLE 5

In this example a starch jelly candy is made in accordance with Example 2, except 3.0% by weight of dusu2 starch is substituted for the aesu2 and dusu2 starch component.

EXAMPLE 6

In this example a starch jelly candy is made in accordance with Example 2, except 3.0% by weight of a 50:50 mix of aedu starch and aedush1 starch is substituted for the aesu2 and dusu2 starch component.

Example 7

In this example a starch jelly candy is made in accordance with Example 2, except 3.0% by weight of a 50:50 mix of aedu starch and aesu2 starch is substituted for the aesu2 and dusu2 starch component.

It will be understood that the claims are intended to cover all changes and modifications of the preferred embodiments of the invention herein chosen for the purpose of illustration which do not constitute a departure from the spirit and scope of the invention.

What is claimed is:

1. A starch jelly candy comprising a cooked gelled starch formulation wherein said formulation having contained:
   (a) a sweetener;
   (b) about 1% to about 25% by weight of a starch composition comprising:
      (i) about 10% to about 90% by weight a first starch, said first starch being a starch from a plant of the dully horny homozygous genotype; and
      (ii) about 90% to about 10% by weight a second starch, said second starch obtained from a plant having a homozygous genotype and selected from the group consisting of amylose extender dull, amylose extender sugary-2, amylose extender dull shrunken-1, dull sugary-2, and mixtures thereof: and
(c) water.

2. The starch jelly candy of claim 1 wherein said formulation comprises:
   about 25% to about 75% by weight of said sweetener;
   about 20% to about 75% by weight water; and further comprising:
   about 0% to about 10% by weight of a flavoring and coloring component.

3. The starch jelly candy of claim 1 wherein said first starch; and said second starch are obtained from maize.

4. The starch jelly candy of claim 2 wherein said sweetener comprises a corn syrup having a DE between about 30 and about 90, and a sugar component selected from the group consisting of monosaccharides, disaccharides, trisaccharides, high intensity sweeteners, and mixtures thereof.

5. The starch jelly candy of claim 4 wherein said monosaccharide is selected from the group consisting of glucose, fructose, ribose, arabinose, mannose, xylose, galactose, and mixtures thereof; said disaccharide is selected from the group consisting of sucrose, maltose, cellobiose, lactose, trehalose, and mixtures thereof; said trisaccharides are selected from the group consisting of maltotriose, raffinose, cellotriose, manninotriose, and mixtures thereof; and said high intensity sweetener is selected from the group consisting of saccharine, aspartame, and Acesulfame-K.

6. The starch jelly candy of claim 4 wherein said sweetener comprises about 20% to about 90% by weight corn syrup and about 80% to about 10% by weight of a sugar component.

7. The starch jelly candy of claim 4 wherein the sugar component is sucrose.

8. The starch jelly candy of claim 2 wherein said flavoring and coloring component is comprised of one or more elements selected from the group consisting of natural flavorants, artificial flavorants, coloring agents, fats, oils, surfactants, humectants, vitamins, or preservatives.

9. The starch jelly candy of claim 8 wherein said natural flavorant is a fruit flavorant selected from the group consisting of fruit purees, fruit puree concentrate and dehydrated fruit solids.

10. A starch jelly candy comprising:
    (a) a sweetener;
    (b) a flavoring and coloring component;
    (c) about 1% to about 25% by weight a starch component comprising:
       (i) about 10% to about 90% by weight a first starch, said first starch being a starch from a plant of the dull horny homozygous genotype, and
       (ii) about 10% to about 90% by weight a second starch, said second starch obtained from a plant having a homozygous genotype and being selected from the group consisting of amylose extender dull, amylose extender sugary-2, amylose extender dull shrunken-1, dull sugary-2, and mixtures thereof; and
    (d) water.

11. The starch jelly candy of claim 10 wherein said first starch; and said second starch are obtained from maize.

12. The starch jelly candy of claim 10 wherein said sweetener comprises a corn syrup having a DE between about 30 and about 90, and a sugar component selected from the group consisting of monosaccharides, disaccharides, trisaccharides, high intensity sweeteners, and mixtures thereof.

13. The starch jelly of claim 12, wherein the sugar component is sucrose.

14. A method for making a starch jelly candy comprising:
    (A) forming a starch jelly formulation comprising:
       (i) a sweetener;
       (ii) about 1% to about 25% by weight a starch component comprising:
          (a) about 10% to about 90% by weight a first starch, said first starch being a starch from a plant of the dull horny homozygous genotype, and
          (b) about 90% to about 10% by weight a second starch, said second starch obtained from a plant having a homozygous genotype and being selected from the group consisting of amylose extender dull, amylose extender sugary-2, amylose extender dull shrunken-1, dull sugary-2, and mixtures thereof; and
       (iii) water;
    (B) heating said starch jelly formulation; and
    (C) molding said heated starch jelly formulation in candy molds to form starch jelly candy.

15. The method of claim 14 wherein said starch jelly formulation comprises:
    about 25% to about 75% by weight of said sweetener;
    about 20% to about 75% by weight water; and further comprising:
    about 0% to about 10% by weight of a flavoring and coloring component.

16. The method of claim 15 wherein said first starch; and said second starch are obtained from maize.

17. The method of claim 14 wherein the starch jelly candy formulation is heated to about 240° F. (116° C.) while constantly stirring the formulation.

18. The method of claim 14 wherein the starch jelly candy is heated to about 240° F. (116° C.) using a jet cooker.

* * * * *

UNITED STATES PATENT AND TRADEMARK OFFICE
CERTIFICATE OF CORRECTION

PATENT NO. : 5,035,912
DATED : July 30, 1991
INVENTOR(S) : Susan L. Furcsik et al.

It is certified that error appears in the above-identified patent and that said Letters Patent is hereby corrected as shown below:

Column 6, line 62, change "dully" to --dull--.

Signed and Sealed this

Twenty-ninth Day of December, 1992

*Attest:*

DOUGLAS B. COMER

*Attesting Officer*     *Acting Commissioner of Patents and Trademarks*